E. HOTTINGER.
CAGE FOR ANTIFRICTION BEARINGS.
APPLICATION FILED MAY 21, 1917.
1,252,007.
Patented Jan. 1, 1918.
2 SHEETS—SHEET 1.
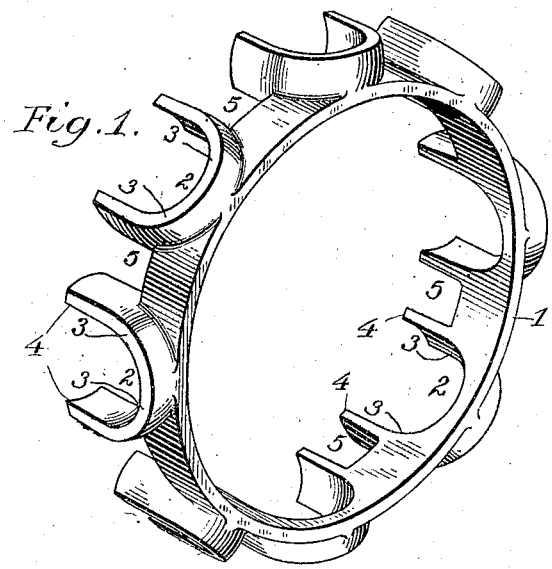
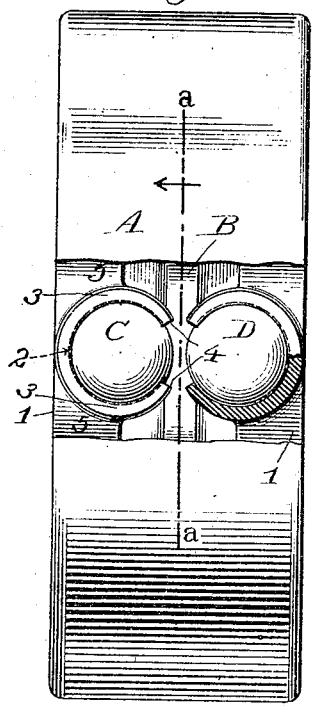
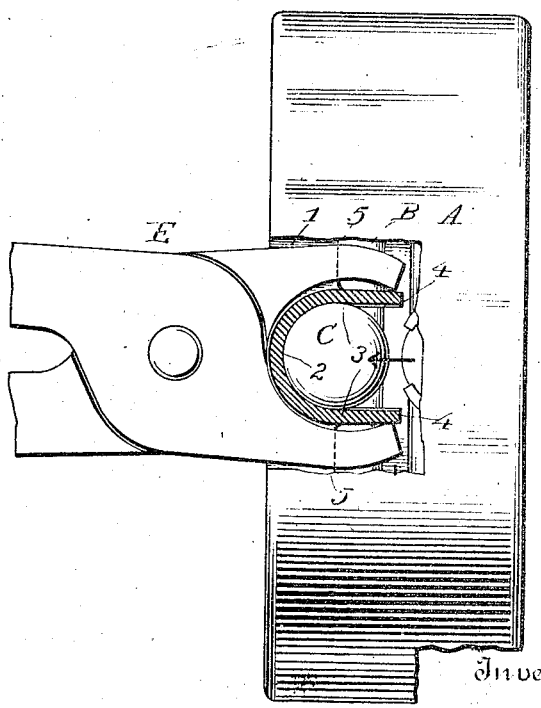

E. HOTTINGER.
CAGE FOR ANTIFRICTION BEARINGS.
APPLICATION FILED MAY 21, 1917.

1,252,007.

Patented Jan. 1, 1918.
2 SHEETS—SHEET 2.

Inventor
Emil Hottinger
By his Attorneys
Rogers, Kennedy & Campbell

UNITED STATES PATENT OFFICE.

EMIL HOTTINGER, OF PHILADELPHIA, PENNSYLVANIA.

CAGE FOR ANTIFRICTION-BEARINGS.

1,252,007.  Specification of Letters Patent.  Patented Jan. 1, 1918.

Application filed May 21, 1917. Serial No. 169,827.

*To all whom it may concern:*

Be it known that I, EMIL HOTTINGER, a citizen of the United States, residing at Philadelphia, in the county of Philadelphia and State of Pennsylvania, have invented certain new and useful Improvments in Cages for Antifriction-Bearings, of which the following is a specification, reference being had therein to the accompanying drawing.

This invention relates to ball spacing cages for ball bearings, which cages are employed between the casing rings of the bearing to hold the balls in spaced relations. A common and well known form of cage for this purpose comprises a base ring provided with deformable ball holding fingers, and in assembling the parts of the bearing the balls are first placed between the casing rings and properly spaced, and the cage is then inserted between the rings with the fingers extending between adjacent balls, and finally the ends of the fingers are bent down on the balls to confine them in spaced relations.

In ball bearings of the double-row type in which two rows or series of balls travel in raceways between the casing rings formed by opposing grooves in the outer side of the inner ring and inner side of the outer ring respectively, it is desirable to employ a separate cage for each row, because, owing to inaccuracies of manufacture for instance, the different polar velocities of the balls of the two rows will if the balls are contained in a single cage, cause a cramping action. But the use of separate cages in a double row bearing presents difficulties because of the fact that the insufficient space between the two rows (more especially in a deep groove type of bearing where the radial distance between the shoulders of the inner and outer rings is somewhat restricted) precludes the disposition of the base rings of the cages between the rows and therefore necessitates that the rings be on the outer sides of the rows. But this location of the rings of cages of known form at the outer side interferes with free access to the fingers of the cage for the purpose of bending them down on the balls.

My invention aims to overcome this objection, and to provide a form of cage adapted for the individual rows of the two series, which cages may be assembled in the bearing with the base rings at the outer sides and which at the same time will give free access to the ball holding fingers for the purpose of bending them down on the balls.

With this end in view my improved cage comprises a base ring and ball holding members or fingers projecting from the side of the ring and producing pairs of deformable prongs or fingers adapted to be bent down on the balls to confine them, the distance between the pairs and the disposition of the base ring relatively to the same, being such that spaces will be left between the fingers in which their full width will be exposed; whereby a suitable bending tool may be introduced between the fingers and engaged with them to bend them down on the balls.

The invention consists also in so disposing the fingers relatively to the base ring that the portions of the ring between adjacent balls held by the fingers, will be included in the planes connecting the centers of adjacent balls; whereby the forces exerted by the balls in the operation of the bearing, either tending to separate them or crowd them together, will be prevented from buckling or bending the base ring.

In the accompanying drawings:

Figure 1 is a perspective view of my improved cage in one form of the invention.

Fig. 2 is a side elevation of an assembled double row ball bearing equipped with spacing cages embodying my invention, the outer casing ring of the bearing being partly broken away to show the position of the two cages therein.

Fig. 3 is a similar view showing the application of the bending tool to bend the fingers of the cage down on the balls.

Referring to the drawings:

Figure 4:
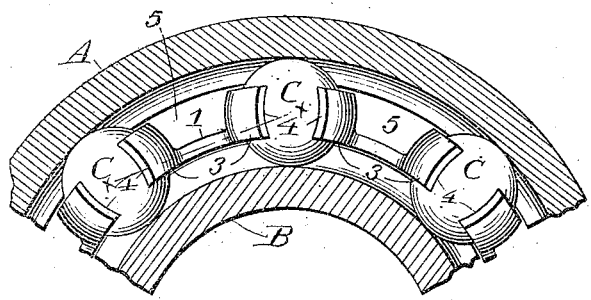
Fig. 4 is a transverse sectional elevation taken on the line *a—a* of Fig. 2.

Referring more particularly to Figs. 1 to 4, the cage comprises a base ring 1 which is formed in one edge with curved notches 2 adapted to receive the balls, and flanges 3 extending laterally from the side of the ring at the edges of the notches, which flanges project beyond the edge of the ring and constitute pairs of deformable ball holding fingers 4 which are adapted to be bent down on the balls to confine them in place.

The flanges at the edge of the notches form in effect ball holding pockets which embrace a portion of the ball's surface, and when the fingers are bent down on the balls as shown in Fig. 2, the balls are individually spaced from each other in two independent series.

In Fig. 2 the bearing, comprising an outer casing member A and an inner casing member B, and two series of balls C and D, is equipped with my improved spacing cages, which are assembled in the bearing with their base rings at the outer sides of the rows and extending axially, and with the flanges extending radially from the sides of the ring. As thus arranged, free spaces 5 are formed between the pairs of fingers in which spaces the full width of the fingers is freely exposed, so that as shown in Fig. 3, a bending tool, in the present instance in the form of pincers E, may be inserted between the bearing rings of the bearing and alongside of the base ring of the cage, and the jaws of the pincers engaged with the fingers to bend them down on the balls.

In assembling the parts of the bearing, the balls are first introduced between the casing members and properly spaced circumferentially therearound. A cage in the form shown in Fig. 1 is then inserted between the bearing rings and the projecting fingers of the several pairs passed on opposite sides of the balls. The bending tool is then inserted between the rings of the bearing and is operated on the fingers to bend them down, this operation being repeated until all of the balls of the series are confined in their pockets in the cage. A second cage is then inserted in like manner between the bearing rings at the opposite side and the fingers similarly bent down on the balls of the other series, thereby completing the assemblage as shown in Fig. 2.

Figure 5:
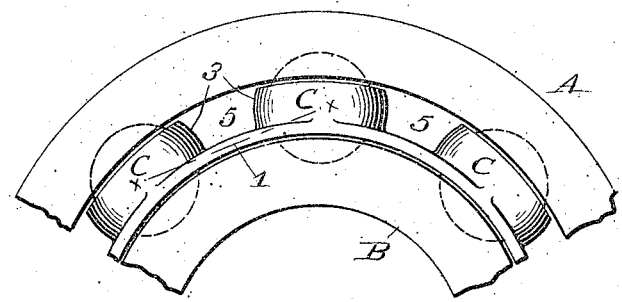
Fig. 5 is an end elevation of a portion of the bearing.

It is seen therefore that the two series of balls are confined in individual cages with their base rings at the outer sides of the rows and, owing to the axial disposition of the rings, and the projection of the fingers radially from the sides of the rings, the fingers are exposed for their full width in the spaces 5 separating the pairs as shown in Fig. 5 so that the bending tool may be freely inserted to bend the fingers down as shown in Fig. 3.

The relation of the base ring to the ball pockets formed by the flanges is such that the portions of the base ring between the pockets extend in planes indicated by the dotted lines $x$—$x$ in Fig. 4 which include and are coincident with the planes connecting the centers of the balls in adjacent pockets. This I deem of advantage and importance in that the lines of force set up by the balls in the operation of the bearing, either tending to crowd together or force them apart, is received by the base ring endwise in the direction of its linear extent, so that there will be no danger of these forces buckling or bending the ring as they might otherwise do if the forces were exerted in planes relatively offset to the base ring.

Also the relative location of the flanges and base ring permits of a greater available space between the pockets for the entrance of the bending tool, and at the same time allows the clamping pressure of the jaws to be exerted on a line which passed through the ball center and not at one side.

Figure 6:
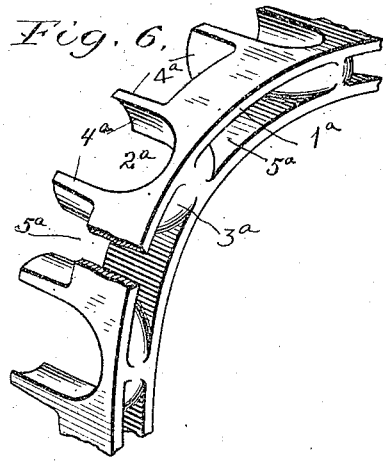
Fig. 6 is a perspective view of a portion of a modified form of the cage.

In the modified form of the cage shown in Fig. 6, the cage comprises two spaced base rings 1ª extending parallel to each other, the flanges 3ª at the edges of the notches 2ª extending between the rings and connecting them together. These flanges extend as in the first instance described, beyond the edges of the rings and form, as in the first form of cage, deformable fingers 4ª which are exposed in the space 5ª between the pockets, and in which spaces the bending tool may be introduced and engaged with the fingers to bend them down on the balls similar to the operation described in connection with the other form of cage. A cage of this form, with the two connected base rings possesses the advantage of being stronger and stiffer and therefore better adapted for use in bearings of large size.

In the foregoing description and accompanying drawings I have set forth my invention in the particular detailed forms which I prefer to adopt. It will be manifest, however, to the skilled mechanic that many changes and variations may be made in its construction without departing from the spirit of my invention; and further it will be understood that the invention is not limited to any particular form or construction of the parts except in so far as such limitations are specified in the claims.

Having thus described my invention, what I claim is:

1. A spacing cage for ball bearings comprising a base ring having open notches in its edge to receive the balls, and flanges projecting from one side of the ring at the edges of the notches and extending beyond the edge of the ring and constituting pairs of deformable ball holding fingers adapted to be bent down on the individual balls to confine them in the notches, said pairs of fingers being separated from each other a sufficient distance circumferentially of the ring to admit of the insertion of a bending tool between the pairs and its engagement with the fingers to bend them down on the ball, the portions of the base ring between the pairs of fingers being included in planes connecting the centers of adjacent balls.

2. A spacing cage for ball bearings comprising a base ring and flanges projecting from one side of the ring and extending beyond the edge thereof and constituting deformable ball holding fingers adapted to be bent down on the balls to confine them in place, the said fingers being separated from each other a sufficient distance circumferentially to admit of the insertion of a bending tool between them and its engagement with the fingers to bend them down on the balls, and the portions of the ring between adjacent fingers being included in planes connecting the centers of adjacent balls.

3. A spacing cage for ball bearings comprising a base ring having open notches in its edge to receive the balls, and fingers projecting from the side of the ring at the edges of the notches and extending beyond the edge of the ring and constituting pairs of deformable ball holding fingers adapted to be bent down on the individual balls to confine them in the notches, said pairs of fingers being separated from each other a sufficient distance in a circumferential direction to admit of the insertion of a bending tool between the pairs and its engagement with the fingers to bend them down on the ball, and the portions of said ring between adjacent pairs of fingers being so disposed relatively to the fingers that the bending tool may be engaged with the fingers throughout their full width.

4. A spacing cage for ball bearings comprising a base ring and flanges projecting from one side thereof and beyond the edge of the same and constituting deformable ball holding fingers adapted to be bent down on the balls to confine them in place, said fingers being separated from each other between adjacent balls, and leaving free spaces in which the full width of the fingers is exposed; whereby a bending tool may be inserted between adjacent balls and engaged with the fingers throughout their width to bend them down on the balls.

5. A spacing cage for ball bearings comprising inner and outer parallel base rings having alined notches in their edges to receive the balls, and flanges extending between the rings at the edges of said notches, said flanges projecting beyond the edges of the rings and constituting ball holding fingers adapted to be bent down on the balls to confine them in place, said pairs of fingers being separated from each other a sufficient distance circumferentially to admit of the insertion between the rings of a bending tool and its engagement with the projecting fingers to bend them down on the balls.

In testimony whereof, I have affixed my signature.

EMIL HOTTINGER.

Copies of this patent may be obtained for five cents each, by addressing the "Commissioner of Patents, Washington, D. C."